US012191098B2

(12) United States Patent
Ha

(10) Patent No.: US 12,191,098 B2
(45) Date of Patent: Jan. 7, 2025

(54) SWITCH WITH INTEGRAL OVERCURRENT PROTECTION

(71) Applicant: MP Hollywood, Lombard, IL (US)

(72) Inventor: Cuong Ha, Lincolnwood, IL (US)

(73) Assignee: MP HOLLYWOOD, Lombard, IL (US)

( * ) Notice: Subject to any disclaimer, the term of this patent is extended or adjusted under 35 U.S.C. 154(b) by 204 days.

(21) Appl. No.: 17/952,643

(22) Filed: Sep. 26, 2022

(65) Prior Publication Data

US 2023/0118335 A1 Apr. 20, 2023

Related U.S. Application Data

(60) Provisional application No. 63/248,191, filed on Sep. 24, 2021.

(51) Int. Cl.

| | |
|---|---|
| ***H01H 71/16*** | (2006.01) |
| ***H01H 73/06*** | (2006.01) |
| ***H01H 73/20*** | (2006.01) |
| ***H01H 73/24*** | (2006.01) |

(52) U.S. Cl.

CPC ............ *H01H 71/16* (2013.01); *H01H 73/06* (2013.01); *H01H 73/20* (2013.01); *H01H 73/24* (2013.01); *H01H 2223/002* (2013.01); *H01H 2223/044* (2013.01)

(58) Field of Classification Search

CPC ........ H01H 71/16; H01H 73/06; H01H 73/20; H01H 73/24; H01H 2223/002; H01H 2223/044; H01H 23/16

See application file for complete search history.

(56) References Cited

U.S. PATENT DOCUMENTS

| | | | | |
|---|---|---|---|---|
| 7,855,873 B2 * | 12/2010 | Darr | H02B 1/056 | 361/628 |
| 10,475,603 B2 * | 11/2019 | Wilkins | H01H 11/00 | |
| 10,580,600 B2 * | 3/2020 | Ullermann | H01H 37/5409 | |
| 2003/0043011 A1 * | 3/2003 | Renne | H01H 73/28 | 337/50 |
| 2003/0206094 A1 * | 11/2003 | Korczynski | H01H 73/24 | 337/333 |
| 2009/0115566 A1 * | 5/2009 | Hsu | H01H 37/5409 | 337/336 |
| 2012/0293296 A1 * | 11/2012 | MK | H01H 37/5409 | 337/342 |

(Continued)

FOREIGN PATENT DOCUMENTS

GB 2325345 A * 11/1998 ............... G01K 5/68

*Primary Examiner* — Stephen S Sul

(74) *Attorney, Agent, or Firm* — Knobbe, Martens, Olson & Bear, LLP

(57) ABSTRACT

A switch with an integrated overcurrent protection element can include multiple arc gap between the contacts when opening the circuit during overload protection and switching operations. The switch can include an overcurrent protection element which can make contact with two contact terminals, and which can change to a different shape upon exposure to an overcurrent condition. The overcurrent protection element can also be moved in a direction normal to the two contact terminals between a first position and a second position through the use of a rotary switch to selectively place the overcurrent protection element in contact with the two contact terminals.

20 Claims, 6 Drawing Sheets

(56) References Cited

U.S. PATENT DOCUMENTS

| | | | | |
|---|---|---|---|---|
| 2013/0057381 | A1* | 3/2013 | Kandhasamy ......... | H01H 37/52 |
| | | | | 337/348 |
| 2016/0358738 | A1* | 12/2016 | Schwartz ............... | H01H 19/14 |
| 2021/0035763 | A1* | 2/2021 | Montgomery ......... | H01H 19/36 |

* cited by examiner

SWITCH WITH INTEGRAL OVERCURRENT PROTECTION

INCORPORATION BY REFERENCE TO ANY PRIORITY APPLICATIONS

This application claims the benefit of U.S. Provisional Application No. 63/248,191, filed Sep. 24, 2021, the entire disclosure of which is hereby incorporated by reference.

Any and all applications for which a foreign or domestic priority claim is identified in the Application Data Sheet as filed with the present application are hereby incorporated by reference under 37 CFR 1.57.

BACKGROUND

Technical Field

Embodiments of switches with integral overcurrent protection components are discussed.

Description of the Related Art

In many wiring arrangements, a separate circuit breaker or other overcurrent protection device is provided in series with a switch configured to control the flow of current to a device and through the separate overcurrent protection device.

BRIEF DESCRIPTION OF THE DRAWINGS

Embodiments of this disclosure will now be described, by way of non-limiting example, with reference to the accompanying drawings. Understanding that these drawings depict only certain embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise.

DETAILED DESCRIPTION OF THE PREFERRED EMBODIMENT

Figure 1:
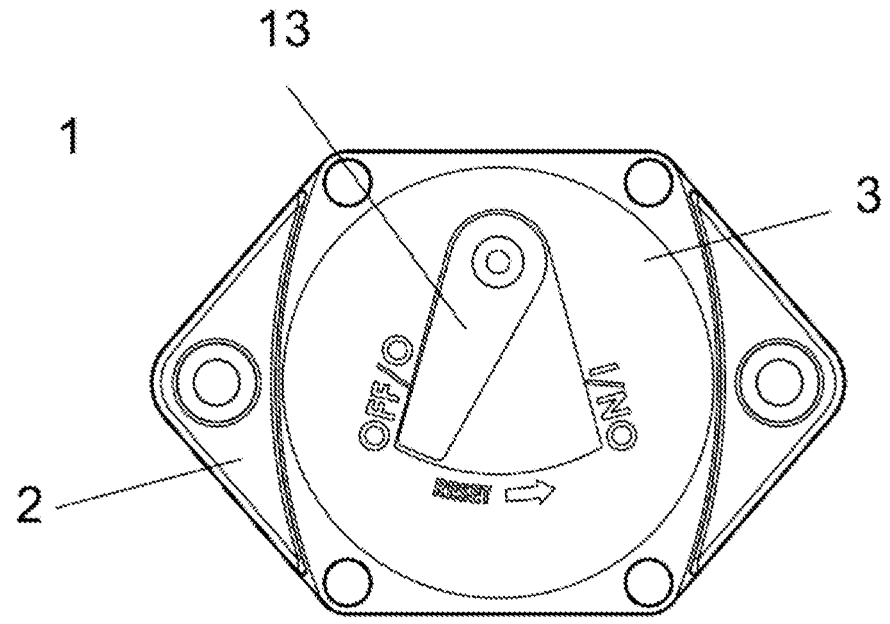
FIG. 1 is a view of an embodiment of a switch with an integrated overcurrent protection element, shown from above, in the off or tripped position.

The following description of certain embodiments presents various descriptions of specific embodiments. However, the innovations described herein can be embodied in a multitude of different ways, for example, as defined and covered by the claims. In this description, reference is made to the drawings, where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

There exist a number of electrical circuit protection devices and a number of manual actuated switches or disconnects rated for low voltage, which may be defined as voltages under 600V. Many electrical circuits, such as circuits in marine applications, require on-off switching, disconnection from battery banks, and over-current protection. To obtain all these functions, a circuit typically requires at least two separate products: a switch/disconnect component, and a separate over-current protection device, such as a fuse or circuit breaker.

In many applications, a switch/disconnect with a manually operated rotational lever actuator is preferred for ease-of-use, to be able to connect one or more power sources, like battery banks, into the circuit, or to disconnect the power source from the circuit entirely. In many of these same applications a manual-reset over-current snap-action circuit breaker is a preferred method of protecting the circuit from damage by electrical currents exceeding the design limits of the wiring, power sources, or loads.

Especially on low voltage applications, it is desirable to limit the loss of (drop in) voltage across any switching/protection devices in the circuit to reduce extraneous heating and power loss and to allow the most voltage to be available to the application load. With some combinations of voltage and current, it is both safer and more effective to create more than one arc gap between the contacts when opening the circuit during overload protection and switching operations. The increase in the length of the gap(s) also can reduce undesirable arcing issues.

A single device which satisfies some of or all these criteria would provide benefits in terms of cost, space, voltage drop, simplicity-of-installation, and ease-of-use. Embodiments described herein relate to switches including an integrated overcurrent protection device. In some embodiments, these switches are manually operated rotary lever actuated switches, but the principles described herein may be applied to other types of switches, including but not limited to throw switches.

Figure 2:
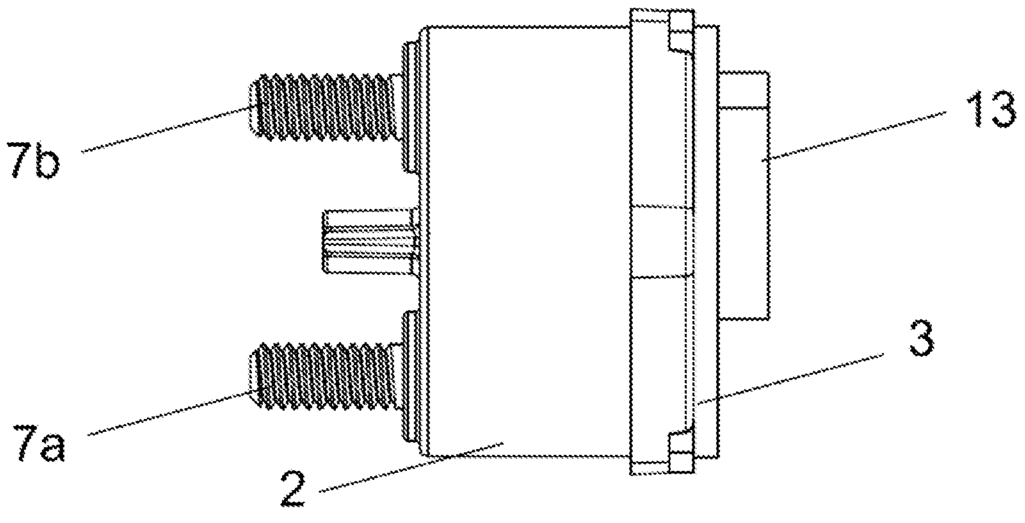
FIG. 2 is a side view of the switch of FIG. 1 showing the two rear terminals.
Figure 3:
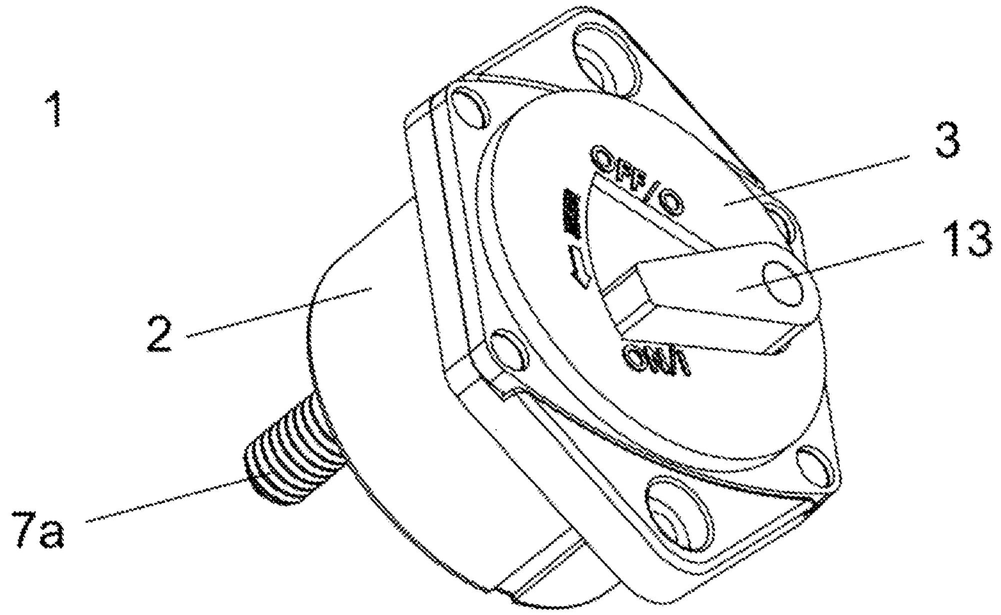
FIG. 3 is a perspective view of the switch of FIG. 1, shown from the side.
Figure 4:
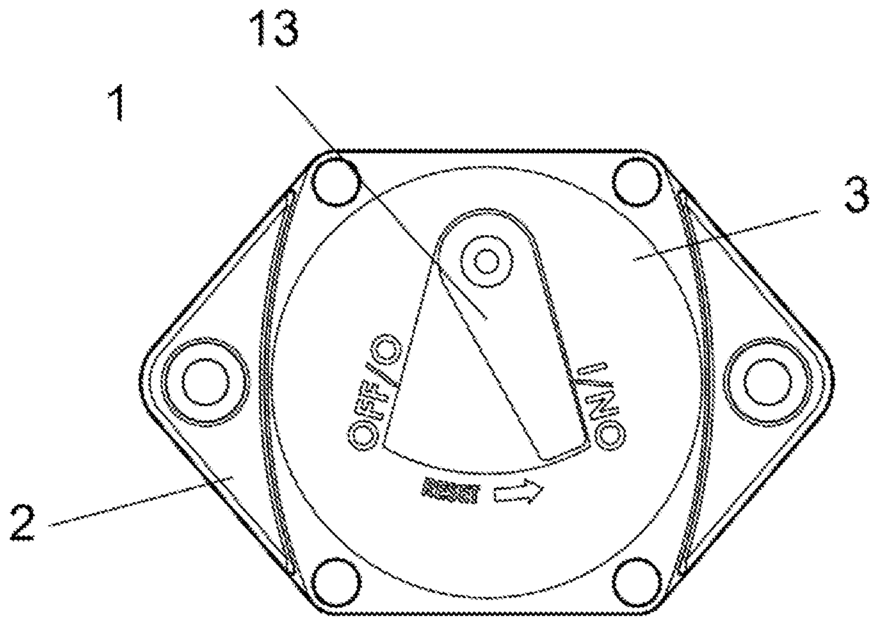
FIG. 4 is a view of the switch of FIG. 1 but the ON or reset position.

FIG. 1 is a top plan view of an embodiment of a switch, referred to as device 1, with integrated overcurrent protection, shown from above, with the indicating lever 13 in the off or tripped position. FIG. 2 is a side view of the switch of FIG. 1 showing both electrically conducting terminals 7*a* and 7*b* extending from the base 2. FIG. 3 is a perspective view of the switch of FIG. 1, shown from the side. FIG. 4 is a view of the switch similar to FIG. 1 but with the indicating lever 13 in the on or reset position.

The switch, device 1, has three states: on, tripped and off. The tripped state is identical in most respects to the off state except that the overcurrent protection element 11 has responded to an electric current over a specified limit. An externally visible indication that the device 1 has moved to the tripped state is provided by the indicating lever 13 having moved into the off position as shown in FIG. 1. The switch will remain in the off position until manually reset to the on position, as shown in FIG. 4. The switch can also be manually switched to the off position from the on position, as the indicating lever 13 serves as manual means for changing the state of device 1, in addition to serving as an indicator of a tripped condition of the switch.

Figure 5:
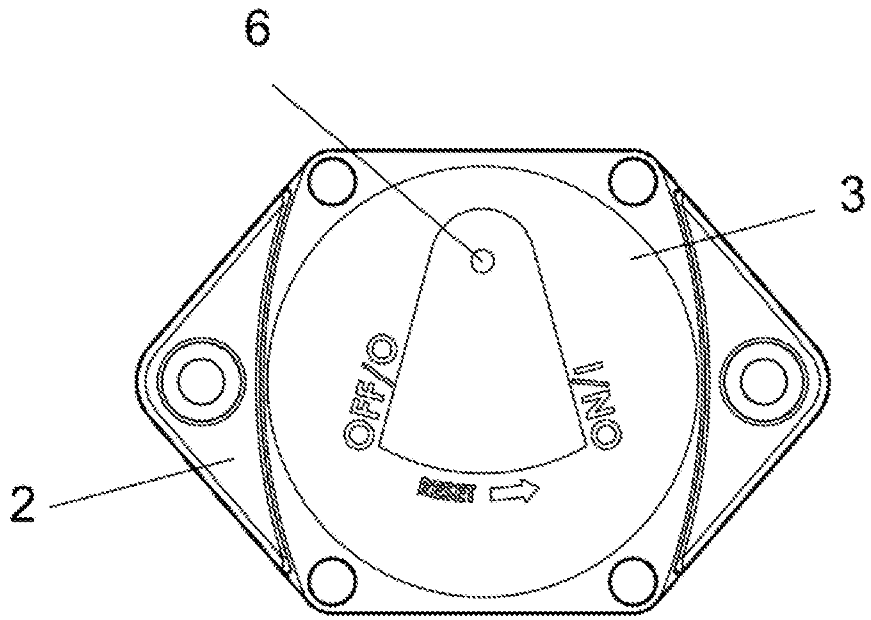
FIG. 5 is a view of the switch of FIG. 1 but with the indicating lever 13 removed to show the through hole 6 in the cover 3.

The generally flat cover 3 is shown in FIG. 5 assembled on device 1 with the indicating lever 13 removed. With the indicating lever 13 removed, the through-hole 6 can be seen. The through-hole 6 allows the rotatable shaft 14 to extend therethrough, in order to connect to one end of the indicating lever 13. The cover 3 encloses the open end 5 of the base 2 shown in FIG. 6. Rivets 18 may be used to compress the cover 3 and a gasket 16 to the base 2, although in other embodiments a wide variety of other fasteners or other retention methods may be used. The base 2 and cover 3 may be formed from or include an electrically insulating material.

Figure 6:
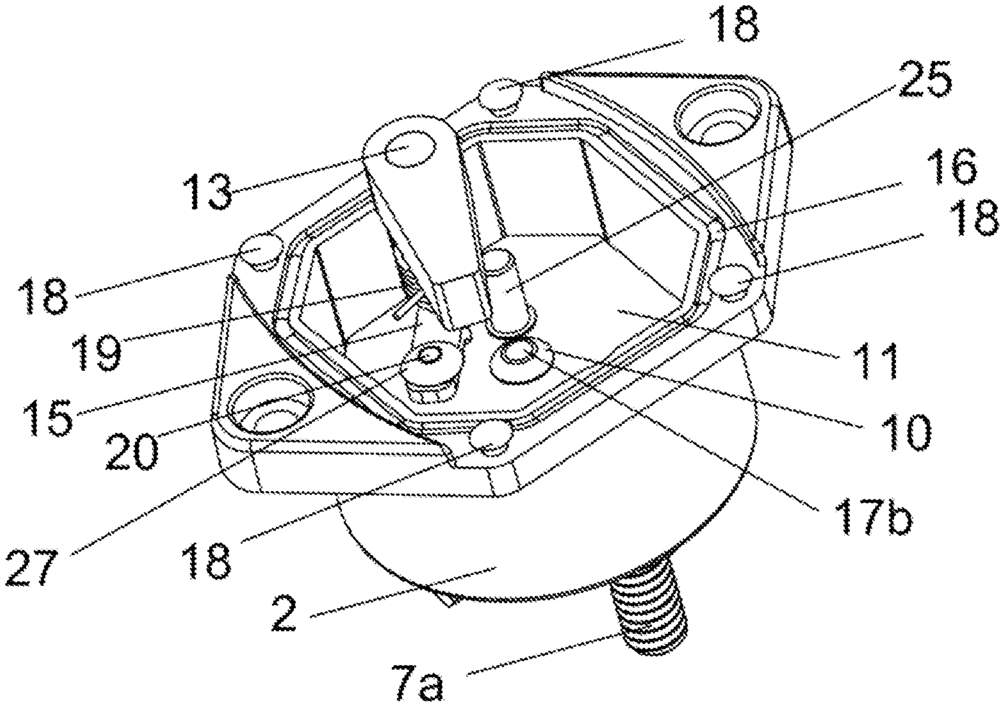
FIG. 6 is a perspective view of the switch with the cover 3 removed to show the gasket 16, several internal components, and the open end 5 of the generally cup-shaped internal compartment 4 of the base 2.

FIG. 6 is a perspective view of the switch 1, shown with the cover 3 removed to expose some of the interior components and demonstrate the general cup shape of base 2 and the open end 5 of the internal compartment 4. In particular, FIG. 6 illustrates certain components of the device 1 when in an off or tripped position. Electrically conducting terminals 7*a* and 7*b* extend through the base 2.

Figure 7:
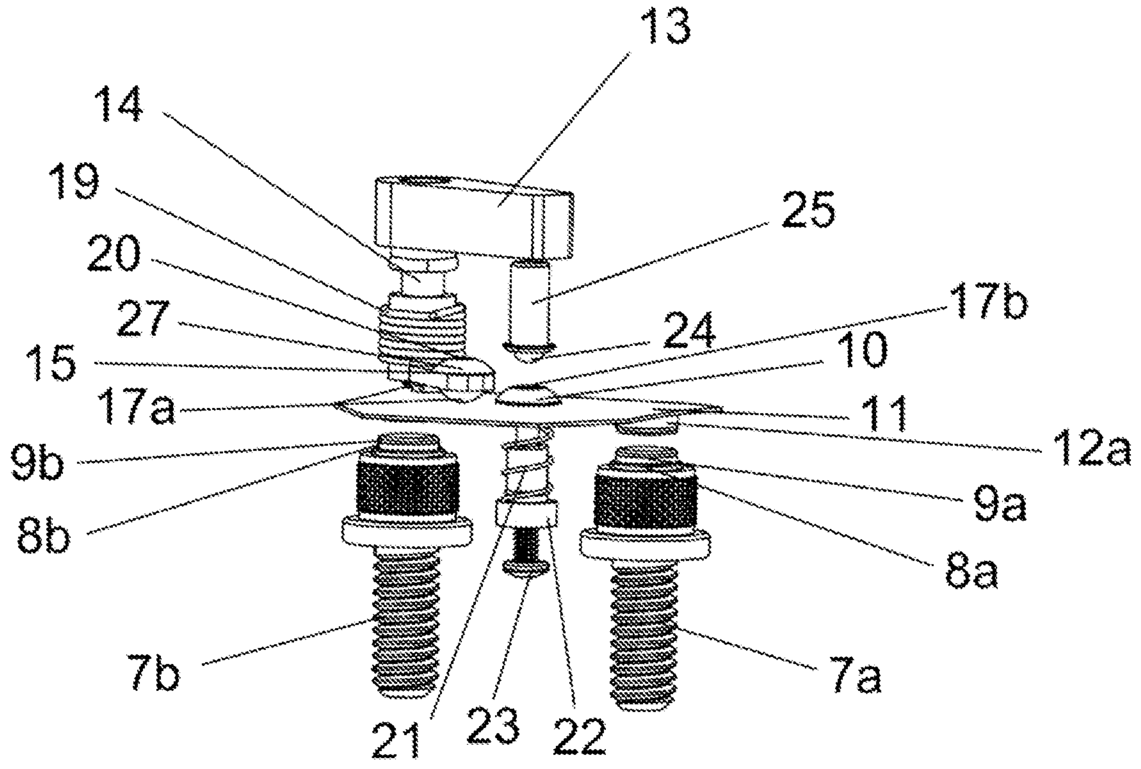
FIG. 7 is a perspective view of the switch with the base 2, cover 3 and gasket 16 hidden to show the mechanism in the off or tripped position.

FIG. 7 is a side perspective view of certain components of the device 1 when in an off or tripped position, with the base 2, gasket 16 and the cover 3 not shown, in order to show the internal mechanism of device 1 in the off position. The terminals 7*a* and 7*b* include electrical contact points 8*a* and 8*b* within the cup shaped portion of the base 2. In the illustrated embodiment, these electrical contact points 8*a* and 8*b* include stationary electrical contacts 9*a* and 9*b*.

The center post 10 is connected to and supports the overcurrent protection element 11. In the illustrated embodiment, the center post 10 pierces or otherwise extends through the center of the overcurrent protection element 11 and fills the inner diameter of the compression spring 21 located between the base 2 and the overcurrent protection element 11.

In the illustrated embodiment, the center post 10 may slide axially within a hole in the post sleeve 22 which sits within a through hole in base 2. The hole in the post sleeve 22 can be threaded on the end opposite the center post 10 such that the axial position of post sleeve 22 relative to the base 2 may be adjusted by the post sleeve screw 23. The post sleeve screw 23 passes through a hole in the base 2 so as to be accessible from the exterior of the switch.

Looking at the latching mechanism, the indicating lever 13 on the exterior of the cover 3 is connected by a rotatable shaft 14 through the through hole 6 in the cover 3 to a second parallel lever 15 within the internal compartment 4 of the base 2. Rotation of either the indicating lever 13 or the second parallel lever 15 thereby rotates both levers by the same angular amount. The end of the second parallel lever 15 opposite the rotatable shaft 14 contains a rivet 27 with an indent 20 facing a mating sloped surface, which in the illustrated embodiment is a surface of a generally spherical metal ball 24. As shown in the side view section detail of the cover 3 in FIG. 9, this spherical metal ball 24 is captured within a ball sleeve 25 imbedded within the cover 3 and backed by a sleeve compression spring 26 within the sleeve providing force to hold the metal ball 24 within the rivet 27 indent 20 when the device 1 is in the on position. On end of the rivet 27 of the second parallel lever 15 opposite the indent 20 is a boss 17*a* facing a mating indent 17*b* on the center post 10.

A torsion spring 19 within the internal compartment 4 biases the second parallel lever 15, the rotatable shaft 14 and the indicating lever 13 to the off position, where the second parallel lever 15 does not contact the center post 10 or the cover 3.

Figure 8:
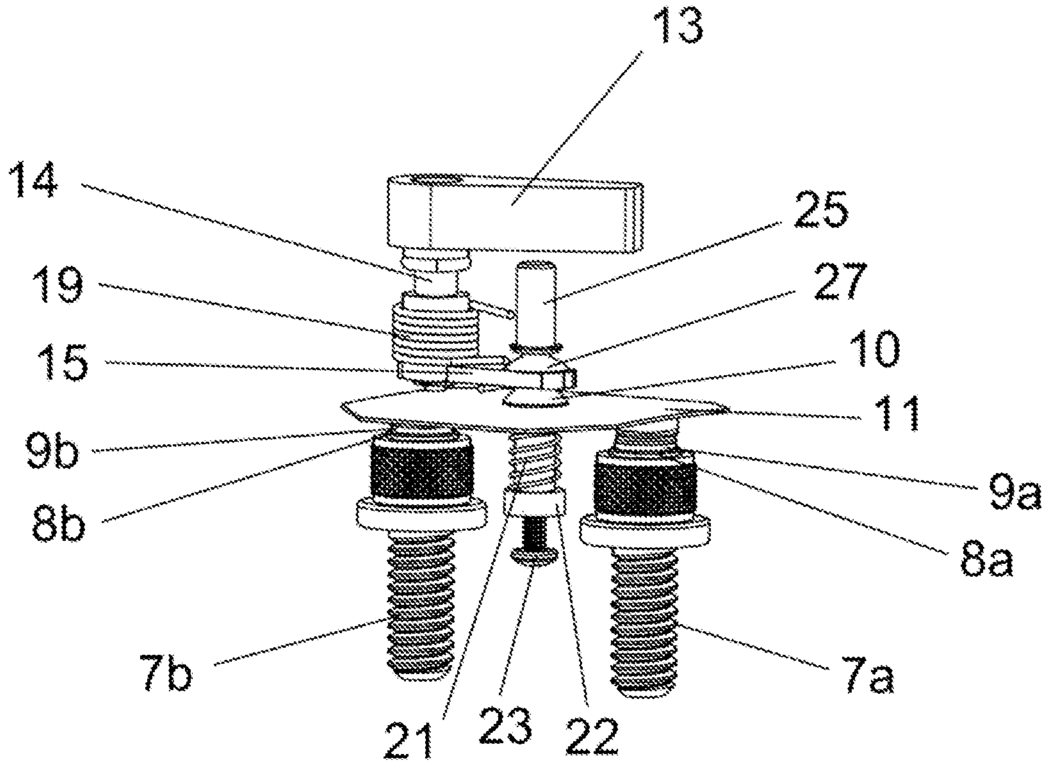
FIG. 8 is a perspective view of the switch similar to FIG. 7 but in the on or reset position.

Looking now at the "on" position shown in FIG. 8, the electrical contacts 12*a* and 12*b* of the overcurrent protection element 11 are in contact with the stationary electrical contacts 9*a* and 9*b* of the switch. In the illustrated embodiment, the overcurrent protection element 11 is a current-sensing or current-dependent element, where the state or configuration of the overcurrent protection element is dependent upon an amount of current flowing therethrough. In the illustrated embodiment, the overcurrent protection element 11 is in a generally planar configuration when in the on position, but in other embodiments, the on position may involve some curvature of the overcurrent protection element 11. In this on position, the overcurrent protection element 11 provides circuit continuity between the stationary electrical contacts 9*a* and 9*b* of the switch.

When excess electrical current above a specified limit flows through the overcurrent protection element 11, the overcurrent protection element 11 responds to the Joule heating by rapidly changing shape to a tripped position in which the electrical contacts 12*a* and 12*b* of the overcurrent protection element 11 are spaced apart from and no longer in contact with the stationary electrical contacts 9*a* and 9*b*. The overcurrent protection element 11 thereby automatically separates the facing electrical contacts from one another and breaks the flow of current through the switch. In some embodiments, the tripped position may separate only one of the electrical contacts 12*a* or 12*b* from the corresponding stationary electrical contact 9*a* or 9*b* of the switch but may still interrupt the flow of excess current through the switch. If only the aforementioned separation of the contacts takes place, this action is commonly described as a "trip-free" trip and can interrupt the flow of excess current through the switch even if the external indicating lever 13 is restrained or blocked from rotating to the tripped or off position. Typically however, as the overcurrent protection element 11 changes shape to the tripped position, the separation of contact 9*a* and 9*b* from contacts 12*a* and 12*b* causes the reduction of the spring force of the overcurrent protective element 11 on the center post 10 and the indent/boss pair 17*a* and 17*b* and indent/ball pair 20 and 24, allowing the torsion spring 19 to rotate the second parallel lever 15 to the off position, thereby allowing the compression spring 21 to further separate the contact pair 12*a* and 12*b* from the stationary contact pair 9*a* and 9*b* and create an even longer contact gap in the tripped or off position. The rotation of the second parallel lever 15 also rotates the rotatable shaft 14 and the indicating lever 13, rotating the indicating lever 13 to the off position to indicate the tripped condition.

As the tripped overcurrent protection element 11 cools down from the Joule heating and automatically flexes back to original shape, the extension of the compression spring 21 maintains a gap between the contact pair 12*a* and 12*b* of the overcurrent protective element 11 and the stationary contact pair 9*a* and 9*b*, allowing the circuit to remain open. The switch then can be manually switched back to the on position after the electrical fault is corrected.

When manually switching from the off or tripped position shown in FIG. 7 to the on position shown in FIG. 8, the indicating lever 13 is manually rotated approximately a quarter turn to the on position, rotating the rotatable shaft 14 and second parallel lever 15 against the torsion spring 19 until the second parallel lever 15 is in a rotational position whereby the indent 20 mates with the ball 24, compressing the sleeve spring 26, and the mating boss/indent pair 17*a* and 17*b* mated together.

This forces the center post 10 to slide axially within the hole in post sleeve 22 against the compression spring 21, and moves the overcurrent protection element 11 and thereby the contacts 12*a* and 12*b* against the stationary electrical contacts 9*a* and 9*b*, closing the electrical circuit. The overcurrent protective element 11 flexes slightly as the contact pairs are mated and creates a spring force on the center post 10 in the same direction as the compression spring 21. The combined force of the compression spring 21 and the overcurrent protection element 11 create enough friction to keep mating indent/boss 17*a* and 17*b* and indent/ball pair 20 and 24 mated together, against the force of the torsion spring 19 trying to rotate the second parallel lever 15. This completes the electrical circuit from electrically conducting terminal 7*a* through contact 9*a*, contact 12*a* the overcurrent protection element 11, contact 12*b*, and contact 9*b* to electrically conducting terminal 7*b*.

Figure 9:
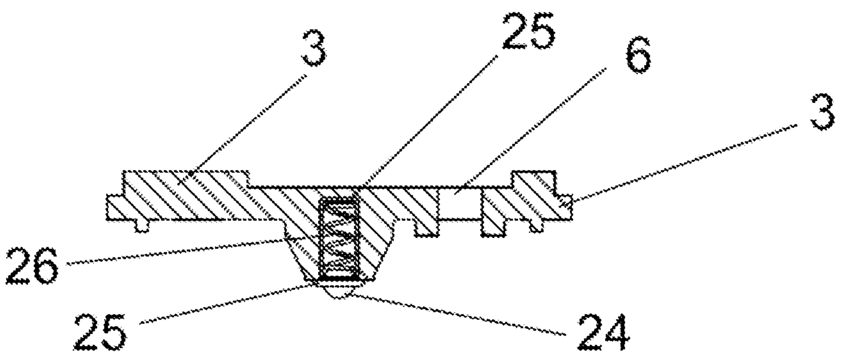
FIG. 9 is a cross sectional side view of the cover 3 and ball sleeve 25 showing the captured spherical metal ball 24 and the sleeve spring 26.

Although a particular geometry is depicted in FIG. 9 and elsewhere, with multiple curved surfaces formed by generally spherical sections of components and corresponding spherical indentations configured to receive and retain a portion of the curved surfaces, the depicted geometry is only one of a wide variety of potential geometries.

For example, in some embodiments, the central shaft may support a boss surface, while a surface with an indent may extend from the interior surface of the switch cover, and the boss and indent on the internal lever may be on the opposite sides of the internal lever. In other embodiments, the internal lever may include a boss on each side, and the central shaft and the surface extending from the interior surface of the switch cover may each include an indent. In other embodiments, the internal lever may include an indent on each side, and the central shaft and the surface extending from the interior surface of the switch cover may each include a boss. Any other suitable combination of bosses and indents can be used, so long as movement of the internal lever to be aligned with the central shaft in a first rotational position results in axial translation of the central shaft against its bias, and the internal lever is retained in position once translated into the first rotational position.

In addition, a boss/indent pair may include any suitable cam surface, whether curved, sloped, angled, or otherwise configured to convert rotary and/or horizontal movement of an intermediate structure within a swept plane into vertical movement of a contacted structure in a direction generally orthogonal to the swept plane. The contacted structure can be biased towards a particular position by a biasing structure such as a spring, and movement of the cam surface(s) to contact the contacted structure can overcome this bias, allowing the cam surface(s) to be pushed into and retained within or against the indentation(s).

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein,"

"above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

While certain embodiments have been described, these embodiments have been presented by way of example only and are not intended to limit the scope of the disclosure. Indeed, the novel apparatus, methods, and systems described herein may be embodied in a variety of other forms; furthermore, various omissions, substitutions, and changes in the form of the methods and systems described herein may be made without departing from the spirit of the disclosure. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A switch including an integrated overcurrent protection device, the switch comprising:

- a generally cup shaped housing having one open end;
- a generally flat cover for the open end of the generally cup shaped housing;
- a first terminal extending into the generally cup shaped housing and electrically connected to a first terminal contact;
- a second terminal extending into the generally cup shaped housing and electrically connected to a second terminal contact;
- a central shaft within the generally cup shaped housing, perpendicular to the generally flat cover, able to slide axially within an internal hole in the generally cup shaped housing and hosting an indent on an end facing the generally flat cover;
- a compression spring concentric to the central shaft and opposing the sliding of the central shaft in a direction away from the generally flat cover;
- a first lever external to the generally flat cover and rotatable parallel with respect to the generally flat cover from a first or "on" position to a second or "off" position;
- a rotatable shaft perpendicular to the generally flat cover, passing through a hole in the generally flat cover and connected on one end of the rotatable shaft to one end of the first lever;

a second lever internal to the generally cup shaped housing, parallel to the first lever, connected on one end to the rotatable shaft;

an indent on the second lever on a side facing the generally flat cover and at an end of the second lever opposite the rotatable shaft;

a centrally located boss on a side of the generally flat cover internal to the generally cup shaped housing, mating with the indent on the second lever when the first lever is rotated into the first position;

a boss on the second lever on a side opposite the indent on the second lever and mating with the indent on the central shaft when the first lever is rotated into the first position thereby moving the central shaft away from the generally flat cover and compressing the compression spring;

a spring rotationally biasing said first lever, second lever and said rotatable shaft to the second position whereby the boss on the generally flat cover no longer mates with the indent on the second lever and the boss on the second lever no longer mates with the indent on the central shaft;

a conductive element within the generally cup shaped housing having a through hole centered on the central shaft and moving with the central shaft when the first lever is in the first position, electrically connecting the first terminal contact and the second terminal contact and in conjunction with the compression spring providing sufficient spring force to maintain the engagement of the boss on the second lever with the indent on the central shaft and the boss on the generally flat cover with the indent on the second shaft when the first lever is in said first position, and when the first lever is rotated into the second position moved toward the generally flat cover by the force of the compression spring so as to not electrically connect the first terminal contact and the second terminal contact.

2. The switch of claim 1, wherein the conductive element comprises an integrated overcurrent protection element, and wherein the integrated overcurrent protection element comprises a bimetallic element configured to change shape in response to electrical current above a specified limit.

3. The switch of claim 2, wherein the bimetallic element is configured to change shape between a first position in which the bimetallic element is electrically connected to the first and second terminal contacts, and a second position in which the bimetallic element is curved such that the bimetallic element is not electrically connected to at least one of the first and second terminal contacts, thus releasing the spring force of the bimetallic element through the central shaft on the second lever and allowing the spring rotationally biased against the second lever to rotate the second lever, rotatable shaft, and first lever to the second or "off" position.

4. The switch of claim 3, wherein the centrally located boss on the cover is a generally spherical metal ball captured within a sleeve imbedded within the cover and backed by a compression spring within the sleeve.

5. The switch of claim 4, wherein the boss and indent on the second lever are formed on a rivet which passes through a hole in the end of the second lever and is perpendicular to the cover.

6. The switch of claim 5, wherein the hole in the generally cup shaped housing in which the central shaft slides contains a metal sleeve with a central hole perpendicular to the cover wherein the central shaft may slide, an end of said central hole opposite the central shaft being threaded to accommodate an partially external adjusting screw to vary the height of said sleeve with respect to the cover within the generally cup shaped housing, thereby changing the compressed height of the compression spring.

7. The switch of claim 6, wherein a gasket seals an interface between the cover and the open end of the generally cup shaped housing.

8. The switch of claim 7, wherein the cover and gasket are held to the generally cup shaped housing by means of one or more rivets.

9. A switch comprising an integrated overcurrent protection device, the switch comprising:

a housing;

first and second terminal contacts within the housing;

an axially translatable central shaft comprising an indent on an end of the axially translatable central shaft facing an interior surface of the housing;

a spring member inhibiting axial translation of the axially translatable central shaft in a direction away from the interior surface of the housing;

an external lever external to the housing;

a boss supported by the interior surface of the housing and spaced apart from the axially translatable central shaft;

an internal lever within the housing and rotationally coupled to the external lever, such that rotation of the external lever induces rotation of the internal lever, the internal lever comprising an indent on a side of the internal lever facing the internal cover and a boss on a side of the internal lever opposite the indent on the internal lever, the internal lever rotatable to a first position in which the boss supported by the interior surface of the housing mates with the indent on the internal lever and the boss supported on the internal lever mates with the indent on the axially translatable central shaft;

a spring rotationally biasing the internal lever to a second rotational position in which the boss supported by the interior surface of the housing no longer mates with the indent on the internal lever and the boss supported on the internal lever no longer mates with the indent on the axially translatable central shaft; and a conductive element in the housing supported by the axially translatable central shaft and moving with the axially translatable central shaft when the axially translatable central shaft is axially translated, the spring member biasing the axially translatable central shaft and conductive element to a first axial position in which the conductive element is spaced apart from the first and second terminal contacts, wherein when the internal lever is rotated to the first rotational position the axially translatable central shaft and conductive element are moved to a second axial position in which the conductive element is in contact with the first and second terminal contacts.

10. The switch of claim 9, wherein the interior surface of the housing comprises an internal surface of a cover of the housing.

11. The switch of claim 9 wherein the boss supported by the interior surface of the housing and spaced apart from the axially translatable central shaft comprises a generally spherical metal ball captured within a sleeve imbedded within the interior surface of the housing and backed by a compression spring within the sleeve.

12. The switch of claim 9, wherein the internal lever is rotationally coupled to the external lever via a rotatable shaft passing through a hole in the housing.

13. The switch of claim 9, wherein the spring member comprises a compression spring concentric to the axially translatable central shaft.

14. The switch of claim 9, wherein the conductive element comprises the overcurrent protection element, and wherein the overcurrent protection element comprises a bimetallic element configured to change shape in response to electrical current above a specified limit.

15. The switch of claim 14, wherein the bimetallic element is configured to change shape between a first position in which the bimetallic element is electrically connected to the first and second terminal contacts, and a second position in which the bimetallic element is curved such that the bimetallic element is not electrically connected to at least one of the first and second terminal contacts, thus releasing the spring force of the bimetallic element through the axially translatable central shaft on the internal lever and allowing the spring rotationally biased against the second lever to rotate the internal member to the second "off" position.

16. A switch comprising an integrated overcurrent protection device, the switch comprising:

a housing;

first and second terminal contacts within the housing;

an overcurrent protection element disposed within the housing and configured to change shape from a first shape to a second shape in response to an overcurrent condition;

a central shaft extending from a first interior surface of the housing and supporting the overcurrent protection element, the central shaft comprising an axially translatable end of the central shaft, axial translation of the axially translatable end of the central shaft towards the first interior surface inhibited by a biasing member;

a contact surface supported by and extending from a second interior surface of the housing opposite the first interior surface of the housing, the contact surface axially aligned with the axially translatable end of the central shaft and spaced apart from the axially translatable end of the central shaft;

an external lever external to the housing;

an internal lever within the housing and rotationally coupled to the external lever such that rotation of the external lever induces rotation of the internal lever, the internal lever comprising an indent on a first side of the internal lever and a boss on a second side of the internal lever opposite the indent on the internal lever, the internal lever rotatable to a first rotational position in which the boss and the indent on the internal lever are positioned between the contact surface and the axially translatable end of the central shaft and axially aligned with the central shaft, rotation of the internal lever to the first rotational position moving the axially translatable end of the central shaft axially in the direction of the first interior surface and bringing the overcurrent protection element into contact with the first and second terminal contacts when the overcurrent protection element is in the first shape;

a spring rotationally biasing the internal lever to a second rotational position in which the boss and the indent on the internal lever are no longer axially aligned with the central shaft, the movement of the boss and the indent on the internal lever away from the axially translatable end of the central shaft allowing the axially translatable end of the central shaft to be axially translated away from the first interior surface, spacing the overcurrent protection element away from the first and second terminal contacts when the overcurrent protection element is in the first shape.

17. The switch of claim 16, wherein the indent on the first side of the internal lever mates with one of the contact surface or the axially translatable end of the central shaft and the indent on the second side of the internal lever makes with the other of the contact surface or the axially translatable end of the central shaft.

18. The switch of claim 17, wherein the axially translatable end of the central shaft comprises an indent shaped to mate with the boss on the internal lever, and wherein the contact surface comprises a boss configured to mate with the indent on the internal lever.

19. The switch of claim 17, wherein the contact surface comprises an indent shaped to mate with the boss on the internal lever, and wherein the axially translatable end of the central shaft comprises a boss configured to mate with the indent on the internal lever.

20. The switch of claim 16, wherein the boss on the internal lever comprises at least one of a curved surface or a sloped surface.

* * * * *